March 20, 1956
N. E. BERRY
2,738,653
CONCENTRATION CONTROL FOR ABSORPTION
REFRIGERATING SYSTEM
Filed July 16, 1953
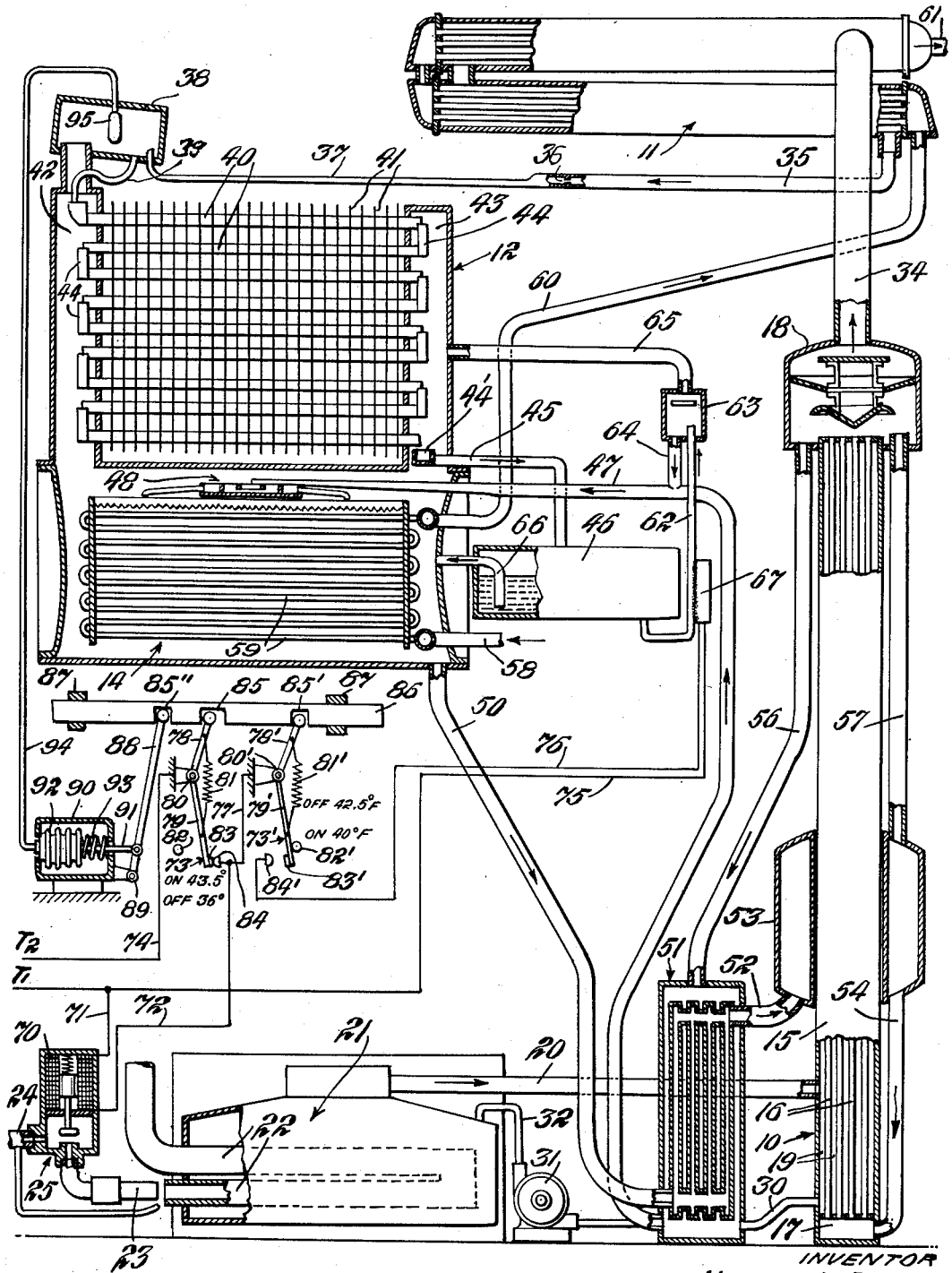
INVENTOR
NORTON E. BERRY
BY
ATTORNEY

United States Patent Office 2,738,653
Patented Mar. 20, 1956

2,738,653

CONCENTRATION CONTROL FOR ABSORPTION REFRIGERATING SYSTEM

Norton E. Berry, Newburgh, Ind., assignor to Servel, Inc., New York, N. Y., a corporation of Delaware Application July 16, 1953, Serial No. 368,484

10 Claims. (Cl. 62—5)

This invention relates to absorption type refrigerating systems and particularly to such systems that operate in a partial vacuum and utilize water as the refrigerant and a saline solution as the absorbent.

More particularly this invention relates to a method of and apparatus for varying and controlling the concentration of the refrigerant-absorbent solution in a refrigerating system of the above type.

Refrigerating systems of the above type may be used for refrigerating any medium and have been used extensively in air conditioning systems to cool air for delivery to an enclosure. If the refrigeration unit is initially charged with saline solution at maximum concentration for particular operating conditions, a change in operating conditions may cause freezing of the refrigerant, water, in the evaporator, the blowing out of liquid refrigerant from the evaporator tubes due to rapid evaporation, superheating of the refrigerant-absorbent solution in the generator or crystallization and precipitation of salt from the solution. The changes in operating conditions may be caused by a decrease in the cooling water temperature, the presence of non-condensable gases in the absorber, particular load variations, or the like. Such changes in operating conditions also may cause a decrease in the difference in pressure between the high and low pressure sides of the unit.

On the other hand, if the unit is initially charged with an excessively dilute solution of the saline absorbent, the refrigerant will not freeze in the evaporator nor be blown from the tubes thereof and superheating in the generator and crystallization and precipitation of salt from the solution will be avoided. However, with such a dilute absorption solution the unit will not produce an evaporator temperature suitable for air conditioning at higher cooling water temperatures or when non-condensable gases are present in the absorber. As the cooling water temperature increases or the amount of non-condensable gases in the absorber decreases, the difference in pressure between the high and low pressure sides of the unit increases.

It had been the practice to initially charge such refrigeration units with a saline solution of such concentration as to produce the best results for average cooling water temperatures and nominal amounts of non-condensable gas to adapt the unit for use in any locality, but the unit would not have optimum operating characteristics with cooling water at high or low temperatures.

Lowell McNeely in his United States Patent No. 2,465,904 discloses and claims a method of and apparatus for controlling the concentration of the refrigerant-absorbent solution wherein the absorption refrigeration unit is initially charged with saline solution sufficiently diluted so as to produce a rated capacity for low cooling water temperatures without blowing refrigerant out of the evaporator tubes. When the difference in pressure between the high and low pressure sides of the unit increases due to a changed condition such as an increase in the cooling water temperature, the purging of non-condensable gases from the absorber, a decrease in air temperature or the like, unevaporated liquid refrigerant in quantities proportional to the increase in the pressure differential is diverted and stored outside the active part of the system in a storage vessel connected between the evaporator and generator. The diversion and storage of liquid refrigerant progressively increases the concentration of the absorption solution circulating in the system which, in turn, tends to decrease the pressure and temperature in the evaporator to compensate for the changed condition which tends to increase the evaporator pressure and temperature and thereby maintain the refrigeration capacity and efficiency of the unit more uniform under varying conditions of operation.

The above McNeely system will continue to operate at the same evaporator pressure and temperature until another change occurs in the operating conditions. Upon a decrease in the difference in pressure between the high and low pressure sides of the system due to a decrease in the cooling water temperature, the presence of non-condensable gases in the absorber, an increase in the air temperature or the like, the liquid refrigerant in the storage vessel is delivered to the generator in amounts proportional to the decrease in the pressure differential to progresesively dilute the absorption solution. The diluted absorption solution will tend to increase the temperature and pressure in the absorber and evaporator to compensate for the changed condition which tends to decrease the evaporator pressure and temperature and thereby prevent freezing of refrigerant in the avaporator, blowing out of liquid refrigerant from the evaporator tubes, superheating of the absorption solution in the generator or crystallization and precipitation of salt from the solution.

The McNeely system has operated very satisfactorily under most conditions of operation. However, it has been found to have certain disadvantages. The McNeely method is to connect the concentration control vessel to the solution circuit in the generator in such a manner that the vessel is emptied each time the unit is turned off. This has the disadvantage that the vessel must be filled again by evaporator overflow each time operation is resumed. This is a source of appreciable loss of efficiency and it also results in a decreased percent latent removal while the concentration control vessel is filling. Furthermore, the amount of storage is determined by the difference in pressure between the high and low pressure sides of the system rather than by the flash chamber temperature, which is the factor it is desired to control. This indirect control is not then wholly satisfactory when the unit is on half input or when "city water" type cooling of the absorber and condenser is used.

Briefly, the present invention incluudes a method of and apparatus for operating a concentration control which obviates the above disadvantages and provides more direct control of the flash chamber temperature, and thus the evaporator temperature. The invention involves the use of a storage vessel to collect overflow refrigerant from the evaporator with any required dumping of the refrigerant controlled by the flash chamber temperature itself. Also, the stored refrigerant is delivered from the storage vessel to the absorption solution line leading directly to the absorber rather than to the generator.

This draining control might be done by means of a temperature actuated valve in a drain line from the concentration control vessel with the control bulb in the flash chamber.

Another method is the use of an electric heater in the control vessel actuated by the flash chamber temperature. In this case the stored refrigerant is returned to the system, when required, by vaporization rather than actual drainage.

Another method is the use of a heater in the control vessel to raise the temperature and thus the vapor pressure of the stored refrigerant so as to force liquid out through a bottom drain and up to discharge into a solution line at a higher level.

The preferred method, which is described in detail hereinafter, is to provide the storage vessel with a "sidearm" pump tube and an electric heater, controlled by the flash chamber temperature, so that refrigerant can be transferred by vapor lift pumping from the storage vessel to the solution entering the absorber. This method provides rapid response with a low wattage heater.

In refrigerating systems of the type disclosed herein, it is common practice to provide a low temperature cut-out for deenergizating the system in the event the evaporation approaches a temperature sufficiently low to cause the refrigerant, water, to freeze therein. Such a control automatically cuts off the supply of heat to the refrigerant generator responsive to the evaporator or flash chamber temperature when such temperature reaches a low of about 36° F., and automatically cuts on the supply of heat when the evaporator reaches a high temperature of about 43.5° F.

The pump heater of applicant's invention may be controlled separately by means of a thermostatic switch actuated by the flash chamber temperature such that dumping of the concentration vessel would start before the unit would cut off on the low temperature cut-out. Or since the need for dumping of the concentration control vessel is infrequent, it would be satisfactory to combine this control with the low temperature cut-out and arrange for the pump heater to be turned on when the unit cuts off on low temperature, and to be turned off when the unit comes on again.

I prefer, however, a dual type of control that is operated by a single thermostat bulb located in the flash chamber or on one of the evaporator tubes. The thermostat operates a pair of switches, one of which is a low temperature cut-out switch located in the electric circuit to a solenoid valve for supplying fuel gas to the heat source for the refrigerant generator, and the other switch, which is in series with the first switch, is in the electric circuit that energizes the heater for the concentration control pump. The first switch opens the solenoid circuit which closes the fuel line to the generator when the flash chamber reaches a temperature of 36° F., and it closes with a temperature of 43.5° F. The second switch closes the circuit to the pump heater when the flash chamber temperature reaches 40° F. and opens with a temperature of 42.5° F. Thus it is seen that the concentration control pump will operate as intended, whenever such operation is required, independently of the low temperature cut-out. However, if the pumping of stored refrigerant back into the solution circuit does not anticipate and prevent operation of the low temperature cut-out, its operation will open the circuit to the pump heater as well as to the solenoid.

This invention together with its objects and advantages is set forth in more technical detail in the following description and accompanying drawing in which the single figure shows more or less diagrammatically a refrigerating system incorporating this invention.

Referring to the drawing, the apparatus shown comprises basically a two-pressure water absorption type refrigerating unit generally as described in said McNeely Patent No. 2,465,904. An apparatus of this type operates below atmospheric pressure and includes a generator 10, a condenser 11, an evaporator 12 and an absorber 14 which are interconnected in such a manner that flow of fluid between the high and low pressure sides of the apparatus is regulated by liquid columns and by a pressure reducing orifice.

The generator 10 includes an outer shell 15 within which are disposed a plurality of vertical riser tubes 16 having the lower ends thereof communicating with an inlet chamber 17 and the upper ends thereof extending into and above the bottom of a separating vessel 18. A space 19 within the shell 15 and about the tubes 16 forms a steam chamber to which steam is supplied through a conduit 20 from a steam boiler 21. The boiler 21 is provided with heating tubes 22 which are adapted to be heated by the products of combustion from a gas burner 23. A combustible gas is delivered to the burner 23 from a source of supply through a conduit 24 in which is provided a solenoid-operated valve 25 connected by conductors to a suitable source of electrical energy and controlled in a manner to be referred to in more detail hereinafter. The water in the boiler 21 is heated by the hot gases passing through the heating tubes 22, thereby producing steam which flows through conduit 20 to the generator 10. Condensate formed in the steam chamber 19 of the generator is returned to the boiler 21 through a conduit 30, a condensate return pump 31 and a conduit 32.

The system contains a refrigerant-absorbent solution wherein water is the refrigerant and lithium chloride, lithium bromide or a mixture of the two is the absorbent. With steam supplied through conduit 20 to the space 19 of the generator, heat is applied to the tube 16 whereby water vapor is expelled from solution. The absorption solution is raised by gas or vapor-lift action with the expelled water vapor forming a small core within an upwardly rising annulus of the solution. The expelled water vapor rises more rapidly than the solution with the solution flowing along the inside walls of the tubes 16.

The water vapor flows upwardly through the tubes or risers 16 into the vessel 18 which serves as a vapor separator. Due to baffling in vessel 18, the water vapor is separated from the raised absorption solution and flows through a conduit 34 into the condenser 11, wherein the vapor is condensed to liquid. The liquid refrigerant formed in the condenser 11 flows therefrom through a conduit 35, an orifice 36 and a conduit 37 into a flash chamber 38, and from there the liquid refrigerant flows through a conduit 39 into the upper part of the evaporator 12. The orifice 36 in conduit 35 is of such size as to pass all of the liquid refrigerant condensed in the condenser 11 and permit a limited flow of refrigerant vapor therethrough to purge non-condensable gases from the condenser, as disclosed and claimed in my Patent No. 2,563,575, granted August 7, 1951.

The evaporator 12 comprises a series of substantially horizontal tubes 40 provided with heat transfer fins 41 and extending between headers 42 and 43. Liquid refrigerant supplied by the conduit 39 to one end of the uppermost tubes 40 in the header 42 flows therethrough by gravity and is collected in a trough 44 in the header 43 for directing it into the end of the next lowermost tube. Each tube 40 has a trough 44 for collecting refrigerant from the next adjacent tube and delivering it for flow therethrough by gravity so that the refrigerant flows through each tube successively from the top of the bottom of the evaporator. The trough 44' at the end of the lowermost tube 40 of the evaporator 12 is connected by a conduit 45 to a concentration control vessel 46, to be referred to in more detail hereinafter.

The refrigerant evaporates in the tubes 40 of evaporator 12 with consequent absorption of heat to produce a refrigerating effect which is utilized to cool an air stream flowing over the evaporator tubes. The refrigerant vapor formed in the evaporator tubes 40 flows into the headers 42 and 43 at each end of the evaporator and from there to the absorber 14, wherein the vapor is absorbed by the absorption solution which enters the upper part of the absorber through a conduit 47 and discharges into a distributing device 48. The absorption solution enriched in refrigerant is conducted from the bottom of the absorber 14 through a conduit 50, an inner passage in a liquid heat exchanger 51, a conduit 52, a stabilizing vessel 53, and a conduit 54 into chamber 17 of the generator 10. Refrigerant vapor is expelled out of solution in the generator 10 by heating and the solution is raised by gas- or vapor-lift action in the riser tubes 16, as explained above.

The absorption solution weak in refrigerant or, in other words, the concentrated solution which has been lifted through the riser tubes 16 into vessel 18 flows therefrom through a conduit 56, an outer passage in the liquid heat exchanger 51, and conduit 47 in the upper part of absorber 14. This circulation of absorption solution results from the raising of solution in the riser tubes 16, whereby such solution can flow to the absorber and return from the latter to the generator by force of gravity. The upper part of vessel 53 and the lower part of vessel 18 are connected by a vent conduit 57.

When the apparatus is operating as a cooling unit, the absorber 14 and condenser 11 constitute heat rejecting parts of the refrigeration apparatus and are cooled by a suitable cooling medium such as water, for example, which is conducted from a suitable source of supply through a conduit 58 to a bank of tubes 59 within the absorber, whereby heat of absorption is given up to the cooling water. The cooling water is conducted from the absorber through a conduit 60 to the condenser 11 in which heat of condensation is given up to the cooling water. The cooling water leaves the condenser through a conduit 61.

In accordance with this invention, the concentration control or refrigerant storage vessel 46 is provided with a vapor liquid lift pump 62 that is connected to the bottom of the storage vessel and discharges into an auxiliary separating vessel 63. The vessel 63 is connected by a conduit 64 to the conduit 47 that conveys absorption solution weak in refrigerant to the absorber. A conduit 65 vents the auxiliary separating vessel 63 to the header 43 of the evaporator, and an overflow conduit 66 extends from the bottom of the storage vessel 46 to the interior of the absorber 14. An electric heating element 67 is placed in thermal contact with the pump tube 62 and is energized by a pair of electric supply wires $T_1$ and $T_2$.

As shown, the coil 70 of the solenoid operated gas valve 25 is connected to the conductors $T_1$ and $T_2$ which are connected to a suitable source of electrical supply. One terminal of the solenoid coil is connected by a conductor 71 to the conductor $T_1$, and the other terminal is connected by a conductor 72, a switch 73 and a conductor 74 to the conductor $T_2$. One terminal of the heater 67 is connected by a conductor 75 to the conductor $T_1$, and the other terminal of the heater is connected by a conductor 76, a switch 73', a conductor 77, the switch 73 and the conductor 74 to $T_2$. The switches 73 and 73' are arranged to be controlled sequentially responsive to a temperature condition of the flash chamber 38. Any suitable mechanism may be employed to effect sequential control of the switches 73 and 73', and I therefore do not wish to be limited to the particular arrangement illustrated and now to be described. As shown, the switches 75 and 73' are of the snap-action type and include toggle arms 78, 78' and 79, 79' pivoted at their inner ends at 80 and 80' to suitable supports, and coil springs 81, 81' are connected to the outer ends of the arms.

A pair of stops 82, 82' are provided to limit movement of the lower toggle arms 79, 79' in one direction. When moved in the opposite direction the contacts 83, 83' at the ends of toggle arms 79, 79' cooperate with fixed contacts 84, 84' to complete the circuits for the solenoid coil 70 and the heater 67, respectively. The upper ends of the toggle arms 78, 78' fit into recesses 85, 85' formed in a slide bar 86 which passes through and is movable in suitable supports 87. The slide bar 86 is formed with a recess 85' to receive the upper end of a lever 88 which is pivoted at its lower end at 89 to a frame 90. An intermediate portion of the lever 88 is pivotally connected to a rod 91 which is secured to an expansible-contractible bellows 92 having one end thereof fixed and secured to the frame 90. A spring 93 is interposed between the bellows 92 and the right-hand end of frame 90. The bellows 92 is connected by a capillary tube 94 to a thermal bulb 95 located in the flash chamber 38. If desired the bulb 95 may be located on one of the upper tubes 40 of the evaporator. The bellows 92, tube 94 and bulb 95 constitute an expansible fluid thermostat containing a suitable volatile fluid that increases and decreases in volume with corresponding changes in temperature. The bellows 92 expands and contracts with increase and decrease in volume of the volatile fluid, and these movements of the bellows 92 are utilized to control the switches 73 and 73'.

As shown in the drawing, the switch 73 is closed and the solenoid 70 is energized, so that the gas valve 25 is in open position and fuel is supplied past the valve to the burner 23. The burner heats the steam boiler 21 which supplies steam through conduit 20 to the generator 10, and the refrigerating system is in operation. Also, as shown in the drawing, the switch 73' is open so that the heater 67 for the pump tube 62 is deenergized. The position of the switches 73 and 73' shown in the drawing indicates that the temperature of the refrigerant passing through the flash chamber is above 40° F. and the refrigerating system is operating normally for the conditions at the time, and any overflow refrigerant from the evaporator is being collected in the storage vessel 46. Now then, assuming that liquid refrigerant has collected in the storage vessel 46 in sufficient quantity to increase the concentration of the absorption solution flowing to the absorber 14 to a point that more refrigerant is evaporated in the evaporator 12 and the temperature of the evaporator and of the flash chamber 38 is reduced to say 40° F.

This lowering of the temperature in the flash chamber causes the volatile fluid in the thermostat bulb 95 to decrease in volume which in turn causes the bellows 92 to contract. Contraction of the bellows 92 imparts counterclockwise movement to the lever 88, whereby the bar 86 is moved toward the left. It is to be noted that the recess 85 in the bar 86 is of greater length than is the recess 85'. Under these conditions the upper toggle arm 78 of switch 73 remains stationary, and this switch remains closed, whereas the upper toggle arm 78' moves counterclockwise about the pivot 80'; and, when the spring 81' has moved past the straight line position of the toggle arms, the lower toggle arm 79' moves with a snap-action toward the left to close the contacts 83' and 84'; the contacts 83 and 84 of switch 73 remaining closed. Closing the contacts 83' and 84' completes the electric circuit for the pump heater 67, whereby the pump tube 62 is heated and part of the liquid refrigerant contained therein is vaporized and liquid is lifted by vapor lift action from the storage vessel 46 through the pump tube 62 into the separating vessel 63. This liquid refrigerant flows from the vessel 63 through conduit 64 into conduit 47, where it mixes with the absorption solution flowing to the absorber 14, whereby the absorption solution is diluted.

The diluted absorption solution flowing to the absorber causes the absorber to operate at higher pressure, and, other conditions being unchanged, the evaporator operates at higher pressure and temperature. As the evaporator and flash chamber temperature rises the bellows 92 expands, and when the temperature of the flash chamber reaches about 42.5° F. the slide bar 86, through the lever 88, will have moved to the right a distance sufficient to snap the toggle switch 73' back to the open position shown in the drawing; the switch 73 still remains in the closed position. It is noted that the switch 73' closes with a flash chamber temperature of about 40° F. and opens with a temperature of about 42.5° F. without affecting the position of the switch 73. However, should the flash chamber temperature fall below 40° F., say to 36° F., the bellows 92 will contact to the point that the lever 88 moves the slide rod 86 to the left a distance sufficient to snap the safety cut-out switch 73 to open position, whereby the solenoid coil 70 and the heater 67 are deenergized, the gas valve 25 is closed and the refrigerating system is shut down, thereby preventing a freezing of the refrigerant in the evaporator. The cut-out switch is snapped to closed position when the flash tube temperature reaches about 43.5° F.

Whenever conditions are such that all of the refrigerant from the condenser is not evaporated in the evaporator, usually because the flash chamber and evaporator temperature is high, the excess refrigerant will drain from the lowermost tube of the evaporator through conduit 45 into vessel 46 and will be stored there. This will cause an increase in the concentration of the absorbent solution and a resultant lowering of the flash chamber and evaporator temperature. As the evaporator temperature is lowered, more refrigerant will be evaporated and eventually the evaporator will stop spilling over. If this does not occur before the level in the storage vessel 46 reaches the top of the overflow conduit 66, the excess liquid will flow through conduit 66 into the absorber and re-enter the system, thus preventing excessive concentration of the solution. Actually there will always be a slight overflow of liquid from the evaporator in order to purge the small quantity of absorption solution which is carried from the generator through the separating chamber and the condenser to the evaporator. This will be in the form of a dilute solution of lithium bromide and accordingly after long periods of operation the concentration control vessel 46 could be filled with lithium bromide solution rather than water. To take care of this situation, the overflow line 66 is extended to the bottom of the vessel 46 as shown, and the vessel is located in a manner that the top of the evaporator drain 45 is at a sufficient height so that solution in the storage vessel can be displaced by a water head built up in the evaporator drain. This will also take care of a situation which may arise after shipping when the unit might start up with the vessel 46 full of solution.

During a period of operation when there is no change in cooling water temperature or other conditions, the concentration control vessel will collect the necessary amount of water to essentially stop spill-over from the evaporator and thenceforth the solution concentration, and flash chamber temperature will remain essentially constant during succeeding cycles. In case there is a slow drop in cooling water temperature, there may be some decrease in flash chamber temperature, but within limits this may be offset by natural vaporization of water from the control vessel. In case of a sudden drop in cooling water temperature or a shutdown with high water temperature, with the concentration control vessel full, and a subsequent start-up with low cooling water temperature, the flash chamber and evaporator temperature might drop to the point where the switch 73 opens and the unit cuts off. However, before the switch 73 is opened, due to extreme low temperature in the flash chamber, the switch 73' is closed at a temperature of 40° F. This energizes the heater 67 which causes the liquid refrigerant in the vessel 46 to be pumped up through pump tube 62 into the separating chamber 63. The liquid refrigerant flows from the separating vessel 63 through conduit 64 into conduit 47 where this liquid mixes with the concentrated absorption solution flowing from the generator through conduit 47 to the absorber. If desired, the liquid refrigerant may be conveyed from the auxiliary separating vessel 63 directly to the distributor 48 within the absorber. In either case, the absorption solution entering the absorber is diluted, causing a rise in absorber pressure and temperature and a consequent rise in evaporative temperature. This should stabilize the flash chamber and evaporator temperature. However, if for any reason the evaporator temperature continues to fall, the safety cut-out switch 73 will open at 36° F.

With applicant's invention, it is to be noted, any liquid refrigerant contained in the storage vessel 46 when the unit shuts down, remains in storage during the shut-down period, and a subsequent start-up of the system may or may not cause the stored liquid to be pumped back into the active circuit depending upon operating conditions at the time. It is also to be noted that only so much of the control mechanism as is necessary for complete understanding of this invention is illustrated and described herein. For a detailed description of a complete control mechanism that may be used with the refrigerating system disclosed herein reference may be had to the United States patent of Harry C. Shagaloff, No. 2,610,032, issued September 9, 1952.

Without further description, it is thought that the features and advantages of the invention will be readily apparent to those skilled in the art to which this invention appertains, and it will, of course, be understood that changes in form, proportions and minor details of construction may be resorted to without departing from the spirit and scope of the claims.

What is claimed is:

1. The method of regulating the concentration of the absorption solution to compensate for changes in operating conditions during operation of an absorption refrigerating system which comprises collecting liquid refrigerant in varying quantities out of a normal path of flow of refrigerant-absorbent solution responsive to an increase in temperature in a part of said system, and returning varying quantities of the collected liquid refrigerant to the normal path of the refrigerant-absorbent solution responsive to a decrease in temperature in said part of the system while the system is in operation.

2. The method of regulating the concentration of the absorption solution to compensate for changes in operating conditions during operation of an absorption refrigerating system, having a generator, a condenser, an evaporator and an absorber, which comprises collecting overflow liquid refrigerant in varying quantities from the evaporator in a place of storage outside of the normal path of flow of refrigerant-absorbent solution to thereby concentrate the solution under certain conditions of operation, and returning varying quantities of the stored liquid refrigerant to the normal path of flow of refrigerant-absorbent solution responsive to a decrease in temperature in the evaporator of said system while the system is in operation.

3. The method recited in claim 2 wherein the stored liquid refrigerant is returned to absorbent solution entering the absorber of said system during continuous operation of the system.

4. The method recited in claim 2 wherein the stored liquid refrigerant is held in storage during shut-down periods of operation of the system.

5. An absorption refrigerating system comprising a generator, a condenser, an evaporator, an absorber and conduits interconnecting said elements and providing circuits therewith for flow of a refrigerating medium and an absorption solution, and mechanism operable responsive to changes in operating conditions of the system for regulating the concentration of the absorption solution, said mechanism including a vessel for storing varying quantities of liquid refrigerant out of said circuits under certain conditions of operation of the system for concentrating the absorption solution and means operable responsive to a change in temperature within the system for returning varying quantities of liquid refrigerant from the storage vessel to absorption solution enroute to the absorber during uninterrupted operation of the system to thereby dilute said solution while the system is in operation.

6. An absorption refrigerating system as set forth in claim 5 wherein the means for returning liquid refrigerant from the storage vessel to the absorption solution during continuous operation of the system is operable responsive to a decrease in temperature of the evaporator.

7. An absorption refrigerating system as set forth in claim 5 wherein the means for returning liquid refrigerant from the storage vessel to the absorption solution during continuous operation of the system includes a heat-operated pump for lifting said liquid refrigerant to an elevation from whence said liquid flows by gravity to the absorber.

8. An absorption refrigerating system as set forth in claim 5 wherein said storage vessel is connected in the system in a manner that absorption solution entering said vessel is conveyed therefrom to the absorber during continuous operation of the system.

9. An absorption refrigerating system as set forth in claim 5 wherein said mechanism includes means for discontinuing operation of said system under certain conditions of operation, wherein the means for returning liquid refrigerant to absorption solution is rendered inoperative upon discontinuance of operation of the system, and wherein said storage vessel is connected in said circuits in a manner that liquid refrigerant contained therein is held in storage during shut-down periods of operation of said system.

10. An absorption refrigerating system as set forth in claim 5 which includes a safety cut-out for discontinuing operation of said system responsive to a predetermined low temperature of said evaporator, and means operable responsive to the return of the liquid refrigerant from the storage vessel to the absorption solution for retarding operation of said safety cut-out.

References Cited in the file of this patent

UNITED STATES PATENTS

| | | |
|---|---|---|
| 1,925,361 | Altenkirch | Sept. 5, 1933 |
| 2,465,904 | McNeely | Mar. 29, 1949 |
| 2,550,429 | Reid | Apr. 24, 1951 |
| 2,583,722 | Berestneff | Jan. 29, 1952 |